US007647204B2

(12) United States Patent
Hanson et al.

(10) Patent No.: US 7,647,204 B2
(45) Date of Patent: Jan. 12, 2010

(54) METHOD FOR ESTIMATING THE IMPACT OF FUEL DISTRIBUTION AND FURNACE CONFIGURATION ON FOSSIL FUEL-FIRED FURNACE EMISSIONS AND CORROSION RESPONSES

(75) Inventors: Simon P. Hanson, Venetia, PA (US); Murray F. Abbott, Upper St. Clair, PA (US)

(73) Assignee: Fuel and Furnace Consulting, Inc., Venetia, PA (US)

( * ) Notice: Subject to any disclaimer, the term of this patent is extended or adjusted under 35 U.S.C. 154(b) by 540 days.

(21) Appl. No.: 11/562,491

(22) Filed: Nov. 22, 2006

(65) Prior Publication Data

US 2007/0239365 A1 Oct. 11, 2007

Related U.S. Application Data

(60) Provisional application No. 60/744,357, filed on Apr. 6, 2006.

(51) Int. Cl.
*G06F 17/00* (2006.01)
*F23B 99/00* (2006.01)

(52) U.S. Cl. ......................... 702/182; 702/50; 702/140; 165/11.1; 110/341

(58) Field of Classification Search ................. 702/182, 702/50, 140
See application file for complete search history.

(56) References Cited

U.S. PATENT DOCUMENTS

| | | | |
|---|---|---|---|
| 4,463,437 | A | 7/1984 | Schenck et al. |
| 4,545,009 | A | 10/1985 | Muraki et al. |
| 4,622,922 | A | 11/1986 | Miyagaki et al. |
| 4,676,734 | A | 6/1987 | Foley |
| 4,969,408 | A | 11/1990 | Archer et al. |
| 5,280,756 | A | 1/1994 | Labbe |

(Continued)

FOREIGN PATENT DOCUMENTS

| | | |
|---|---|---|
| WO | WO 02103242 | 12/2002 |

(Continued)

OTHER PUBLICATIONS

Awais, M.M., Application of internal model control methods to industrial combustion (abstract), Applied Soft Computing Journal, v5, n2 (Jan. 2005).

(Continued)

*Primary Examiner*—Hal D Wachsman
(74) *Attorney, Agent, or Firm*—McKay & Associates, P.C.

(57) ABSTRACT

Provided is a method for estimating the impact of fuel distribution on emissions and corrosion responses of a fossil fuel-fired furnace. A variable is determined, termed herein separation number, by inputting fuel oil and air into the furnace, wherein the variable provides a linear relationship to multiple furnace process responses. Emission measurement equipment is located at various furnace outlet positions and thermocouples are located in tubes of the furnace, wherein the responses can be measured to obtain operating data. This operating data is interpreted based on different modes of operation of the furnace, and a change is estimated in the responses as a function of the separation number, wherein the change can be quantified to determine an impact of the fuel distribution or the furnace configuration as a result of the operating data lying on a plane defined by the separation number and a load variable.

16 Claims, 13 Drawing Sheets

U.S. PATENT DOCUMENTS

| | | | | |
|---|---|---|---|---|
| 5,685,706 | A * | 11/1997 | Hersh et al. | 431/8 |
| 5,794,549 | A | 8/1998 | Carter | |
| 6,331,107 | B1 * | 12/2001 | Philippe | 431/285 |
| 6,468,069 | B2 | 10/2002 | Lemelson et al. | |
| 6,522,994 | B1 | 2/2003 | Lang | |
| 6,622,944 | B1 * | 9/2003 | Hurley et al. | 239/426 |
| 6,701,255 | B2 | 3/2004 | Batung et al. | |
| 6,714,877 | B1 | 3/2004 | Lang | |
| 2006/0042525 | A1 | 3/2006 | Lefebvre et al. | |

FOREIGN PATENT DOCUMENTS

| | | |
|---|---|---|
| WO | WO 2005003631 | 1/2005 |

OTHER PUBLICATIONS

Bhasker, C., Flow predictions in power station equipment components through state of art CED software tools, ASME Turbo Expo Land Sea Air, IJPGC-2001, New Orleans, USA, pp. 1-11.

Itaya, H. A simplified mathematical model for the estimation of 2-Dimensional temperature . . . (abstract), Revue de Metallurgie, Cahiers d'Informations Tech., vol. 79, No. 5, May 1982.

Kirschen, M. NOx Emission from electric arc furnace—measurement and modeling, Institute for Industrial Furnaces and Heat Engineering in Metallurgy (date n/a)., 12 pages.

Kremer H., The influence of furnace design on the NO formation in high temperature processes(abstract), faculty mechanical engineering, Ruhr-University (Germany), Sep. 5, 2001.

Laux, S., Coal and air flow measurement for reduced NOx and UBC, EPRI-DOE-EPA symposium, Atlanta, GA, Aug. 16-20, 1999), pp. 1-11.

Scharler, R., CFD analysis of air staging and flue gas recirculation in biomass grate furnaces, 1st World Conference on Biomass, vol. II, Jun. 2000, Sevilla, Spain., 4 pages.

Schneider, H., A numerical study of the gas-particle flow in pipework and flow splitting devices of coal-fired power plant, 10th workshop on two-phase flow predictions, Apr. 2002, pp. 227-236.

* cited by examiner

FLUE GAS RECIRCULATION*

HISTORICAL DATA

FUNCTIONAL RESPONSE
FURNACE NITROGEN OXIDE EMISSION

NO = 79.03+0.5967*FNO-160.5*SN (Hopper Dam ON)

NO - Nitrogen Oxide, FNO - Fuel-N Equivalent Nitrogen Oxide, SN - Separation Number NO = 334.0+0.5303*FNO-205.4*SN (Hopper Dam OFF)

NO - Nitrogen Oxide, FNO - Fuel-N Equivalent Nitrogen Oxide, SN - Separation Number

CHANGE IN SEPARATION NUMBER DUE TO FUEL REDISTRIBUTION

CHANGE IN FURNACE NITROGEN OXIDE EMISSION DUE TO FUEL REDISTRIBUTION

FUNCTIONAL RESPONSE OPACITY

Opacity = -1.6874+0.0026*FNO+0.18*SN (Hopper Dam OFF)
FNO - Fuel-N Equivalent Nitrogen Oxide, SN - Separation Number

CHANGE IN OPACITY DUE TO FUEL REDISTRIBUTION

FUNCTIONAL RESPONSE
METAL TEMPERATURE

T = 655.3+0.0205*FNO-8.126*SN (Hopper Dam OFF)
T - Metal Temperature, FNO - Fuel-N Equivalent Nitrogen Oxide, SN - Separation Number

CHANGE IN METAL TEMPERATURE DUE TO FUEL REDISTRIBUTION

SCR PERFORMANCE

FUNCTIONAL RESPONSE
NITROGEN OXIDES AT SCR EXIT

NO_OUT = 157.0846+0.1752*FNO-95.8176*SN (Hopper Dam OFF)
NO_OUT - Nitrogen Oxide at SCR Exit, FNO - Fuel-N Equivalent Nitrogen Oxide, SN - Separation Number

FUNCTIONAL RESPONSE
SCR EFFICIENCY

NOR = 39.574-0.0149*FNO+23.2176*SN (Hopper Dam ON)
NOR - Nitrogen Oxide Reduction, FNO - Fuel-N Equivalent Nitrogen Oxide, SN - Separation Number

FUNCTIONAL RESPONSE
SCR EFFICIENCY

NOR = 60.6073-0.001*FNO+4.5559*SN (Hopper Dam OFF)
NOR - Nitrogen Oxide Reduction, FNO - Fuel-N Equivalent Nitrogen Oxide, SN - Separation Number

METHOD FOR ESTIMATING THE IMPACT OF FUEL DISTRIBUTION AND FURNACE CONFIGURATION ON FOSSIL FUEL-FIRED FURNACE EMISSIONS AND CORROSION RESPONSES

SPECIFIC REFERENCE

The instant application hereby claims benefit of provisional application, Ser. No. 60/744,357, filed Apr. 6, 2006.

BACKGROUND

Economical decisions regarding the operations of furnaces, for example in the power generation industry, are typically made based on trial and error, if at all. An extensive series of experiments would be required to generate information about different operating conditions that impact the outputs of the furnaces. For example, in U.S. Pat. No. 4,622,922 to Miyagaki et al., the combustion control method is characterized by varying the amounts of fuel and air in performing trial operations on manipulated variables to evaluate the emitted nitrogen oxides. Such "trial operations" desired would change the focus of operations from meeting dispatch needs to meeting test condition requirements. Where it is desired to minimize $NO_x$ emissions, for example, by changing the configuration of the furnace or by modifying the rate of fuel and air inputs, the time and expense required to analyze the changes would be very substantial and prohibitive. Collecting large amounts of data and analyzing it can only be done for specific conditions at one time, and long lead times are required to ensure consistent and steady state test conditions in commercial equipment. Multiple tests are required to obtain good estimates of error in the results. The impact of different furnace operating configurations cannot be tested without first incurring the expense to change the equipment. An accurate and economically efficient estimate of the impact of fuel distribution and furnace configuration change can only be done by using a particular variable/function, disclosed herein as the separation number, which takes into account the distribution of process inputs in the analysis of impacts on downstream or output responses. The equation is found to exhibit a linear relationship with a variety of measured functional responses over a wide range of normal/standard operating conditions, and it is used to analyze historical databases and interpret the impact of operating and design decisions, both past and future, on virtually any downstream functional response.

SUMMARY

Provided is an analytical methodology utilized for fossil fuel-fired furnace operations. Particularly, a variable is first determined, termed herein "Separation Number", which is then used to analyze and interpret the functional responses for a number of measured furnace process variables to the process inputs. The analysis is then used to estimate the impact of fuel distribution and furnace configuration on emissions and corrosion responses.

For this particular application, used in conjunction with a computer, the separation number is first determined and then used to estimate the impact of fuel redistribution on the fuel oil-fired furnace emissions and corrosion responses. Thus, the variable and equations, along with other data manipulation acts and independent physical acts, provide for a practical application of quantifying the impact of fuel redistribution to industrial, furnace firing systems on various functional responses, emissions ($NO_x$, $SO_x$, and opacity) and tube metal temperatures. Accordingly, detailed, comprehensive approaches regarding fuel and furnace configuration changes can lead to better and more economical decisions for operating the fossil fuel-fired furnaces.

The invention generally is a method for estimating the impact of fuel distribution and furnace configuration on emissions and corrosion responses of a fossil fuel-fired furnace, comprising the steps of determining a variable, termed herein separation number, S, by inputting fuel oil and air into the furnace, wherein S provides a linear relationship to multiple furnace process responses; locating emission measurement equipment at an inlet and outlet of a selective catalytic reactor (SCR) of the furnace and locating thermocouples in tubes of the furnace, wherein the responses can be measured to obtain operating data; interpreting the operating data based on different modes of operation of the furnace; and, estimating a change in the responses as a function of the separation number, wherein the change can be quantified to determine an impact of the fuel distribution or the furnace configuration as a result of the operating data lying on a plane defined by the separation number and a load variable. Thus, the impact or change in the functional responses is quantified by applying this determined separation number variable and then using the separation number as part of the methodology to analyze and interpret a number of responses based on the separation of fuel and oxidant to a boiler furnace.

DETAILED DESCRIPTION OF THE PREFERRED EMBODIMENT

Figure 1:
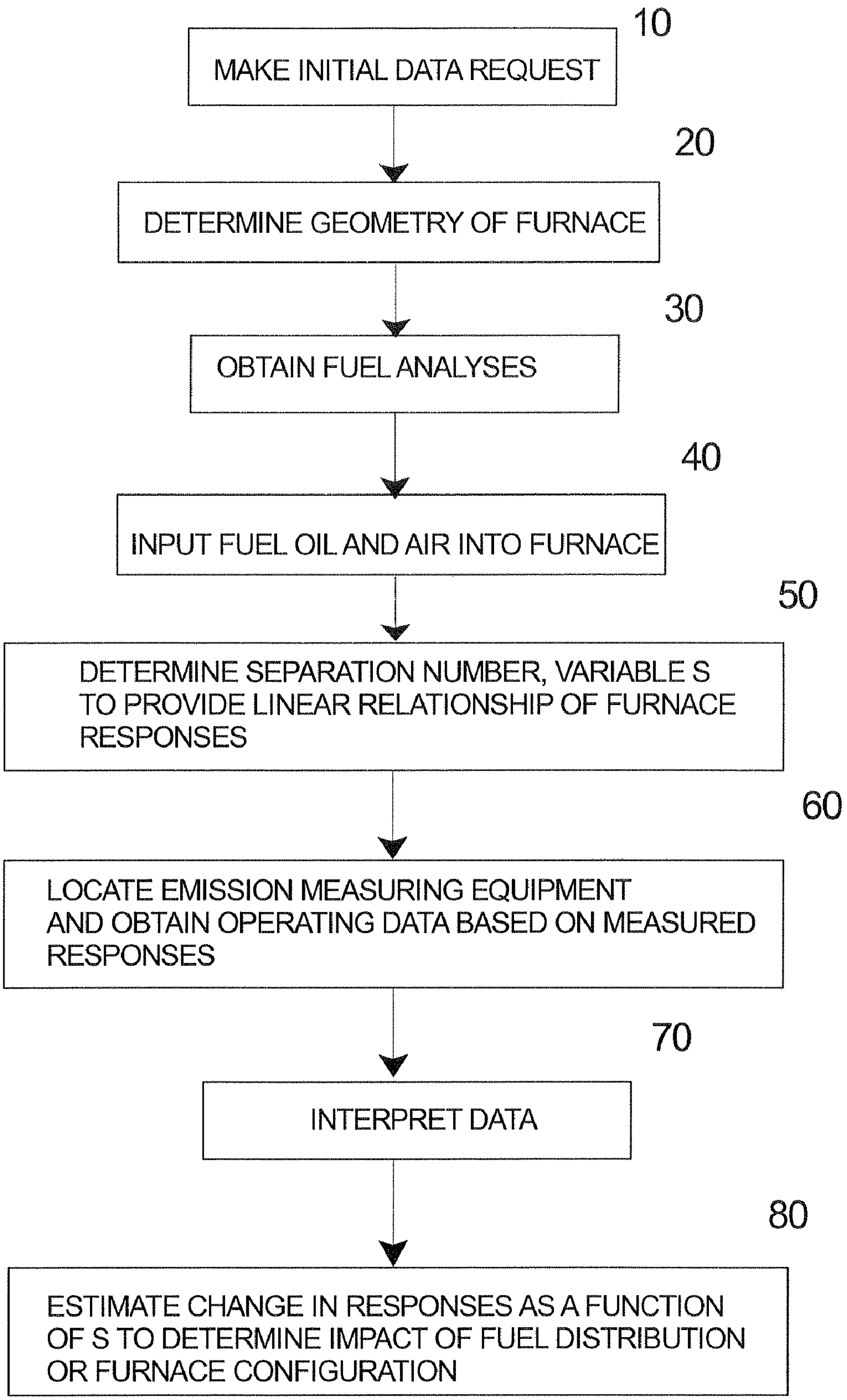
FIG. 1 is a flow diagram representing the overall process.
Figure 1A:
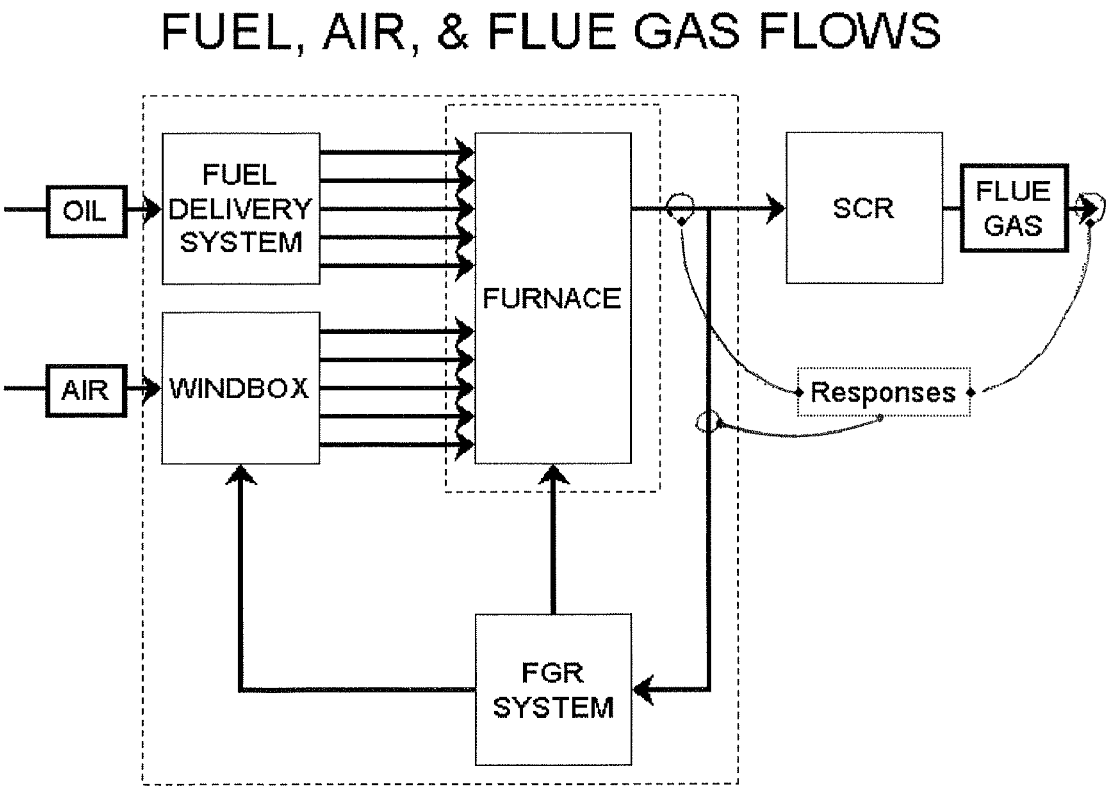
FIG. 1*a* is a schematic representation of the fuel, air, and flue gas flows, including FGR distribution to the furnace hopper and windbox. This figure further shows the general locations where the various functional responses are measured.

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated method, and such further applications of the principles of the invention illustrated herein, as would normally occur to persons skilled in the art to which the invention relates.

As termed herein, separation number is a determined variable defined as the difference between the locations of the weighted average of two or more process inputs to the process vessel. For this particular application, used in conjunction with a computer running a statistics and analytics software package, the separation number is first determined and then used to estimate the impact of fuel redistribution on the fuel oil-fired furnace emissions and corrosion responses. Thus, the variable and equations, along with other data manipulation acts and independent physical acts, provide for a practical application of quantifying the impact of fuel redistribution to industrial, furnace firing systems on various functional responses, emissions ($NO_x$, $SO_x$, and opacity) and tube metal temperatures. Accordingly, detailed, comprehensive approaches regarding fuel and furnace configuration changes can lead to better and more economical decisions for operating the fossil fuel-fired furnaces.

The general definition for Separation Number is given by the two equations below. These equations are applied to the process steps of estimating the impact of fuel distribution and/or furnace configuration changes, which is the practical application. Given $\dot{m}_i(r_i)$ is the mass flux of component i entering a process at $r_j$ where $r_j$ is the position vector, then the mass flux weighted centroid position for component i is defined as follows:

$$R_i = \frac{\sum_{All\ j} \dot{m}_i(r_j) r_j}{\sum_{All\ j} \dot{m}_i(r_j)}$$

and the Separation Number (S) for any two components, j and k, is the distance between their centroids:

$$S_{jk} = |R_j - R_k|$$

Separation Number Analysis, as termed herein is the analytical methodology for this particular application in which the separation number is first determined, and then used to analyze and interpret the functional responses for a number of measured furnace process variables to the process inputs.

Separation Number is a single value that is shown to exhibit a relationship to a variety of furnace process responses. The relatable responses include both mass and energy measurements, e.g., pollutant emission levels and process vessel thermocouple temperatures. For mass concentration measurements (pollutant emissions), this includes both gas-phase and solid-phase responses, e.g., nitrogen oxides ($NO_x$) and opacity.

In the following application, SEPARATION NUMBER ANALYSIS™ (a methodology for using a determined variable) is used to estimate the impact of fuel redistribution on emissions and corrosion responses. The process reactants are fuel oil and air. Fuel oil and air are input to the process through a number of burner ports 40. Additional air is further introduced to the process through a number of over fire air (OFA) ports and also with flue gas recirculation (FGR) through the furnace hopper. The Separation Number is shown to exhibit a linear relationship for a number of tested process responses. All functional response data lie on a plane defined by Separation Number and a Load variable. Excursions from the plane are related to operating transients.

Load generally identifies the work that is done by the heat released from the combustion of the fuel. In this particular application, as used in the figures the load variable is termed Fuel-N Equivalent Nitrogen Oxide. This load variable corresponds to a particular fuel requirement for generating a certain MW rating, and the fuel carries a specific level of nitrogen dependent on fuel composition. As load increases, fuel consumption increases and the total amount of nitrogen carried into the furnace with the fuel increases. The load variable is indicative of the amount of $NO_x$ that is formed if all the fuel-N is converted to $NO_x$. This variable is chosen because the coefficient in the equation for the fit shown in the figures showing the plane is the fuel-N conversion factor, i.e. the percent of fuel-N that is actually converted to $NO_x$. Thus, in a planar plot taking into account load, Separation Number takes into account the variability of distribution of process inputs in the analysis of impacts on downstream or output responses.

In the specific application given here, the Separation Number is successfully used to analyze and interpret a number of responses based on the separation of fuel and oxidant to a boiler furnace. The Separation Number (S) for this case is defined as:

$$S = \sqrt{\sum_i \left( \frac{\sum_k (\dot{m}_{ok} x_{ik})}{\sum_k (\dot{m}_{ok})} - \frac{\sum_k (\dot{m}_{jk} x_{ik})}{\sum_k (\dot{m}_{jk})} \right)^2}$$

where $\dot{m}_{fk}$ and $\dot{m}_{ok}$ are the mass rate of fuel and oxidant through port k, and $x_{ik}$ corresponds to the x, y and z values of port k.

EXAMPLE

For the purposes of this example, an analysis was performed on a fuel oil-fired furnace located in the United States of America, termed herein Unit 1. Although the statistics and analytics software which can be used may vary, the plots of the instant drawings and the data was analyzed by the Statisca software package developed by STATSOFT®. The objective is estimate the impact of fuel redistribution to the existing Unit 1 low-$NO_x$ firing system on various functional responses, emissions ($NO_x$, $SO_x$, and opacity) and corrosion potential (tube metal temperatures).

Pursuant to an initial data request 10, generating station personnel provided current data, reports and drawings for use in the analysis. Drawings typically include OEM fabrication drawings for the boiler, fuel delivery system, burner equipment, and flue gas cleanup equipment. Typical operating data includes fuel and air rates; temperatures for specific equipment of interest; generation rate; steam temperatures, pressures and flow rates; flue gas temperatures and flow rates, NOx, SOx, CO, $CO_2$, $O_2$ and opacity. As much as possible, individual data points should be continuous/real-time, i.e., not averaged.

Correct characterization of furnace behaviors required consideration of three factors:

1. FUEL COMPOSITION
2. FURNACE CONFIGURATION
3. FUNCTIONAL RESPONSES

FUEL COMPOSITION: An average fuel oil analysis was computed and obtained for three samples from April 2005 deliveries. This average analysis is used to convert functional responses, particularly $NO_x$, from volumetric emission or mass emission per unit of energy to mass emission rate, e.g., pounds per hour (pph). Fuel oil analyses are provided by the plant 30. Samples are typically taken during the offloading operation (barge to storage tank) and later analyzed by independent laboratories. In the present example, three fuel oil deliveries were received and later burned by the plant during the period of interest. An average was used to characterize the fuel oil burned at any given time during the period analyzed. This is a good estimate because analyses typically are not significantly different, and the oil tanks on site are basically surge tanks for holding the fuel oil until it is burned, and there is some mixing of the delivered fuel oils in the tank.

BASIS FUEL COMPOSITION

| | NORMALIZED MASS, % |
|---|---|
| CARBON | 87.97 |
| HYDROGEN | 9.966 |
| SULFUR | 0.9146 |
| NITROGEN | 0.3300 |
| OXYGEN | 0.8594 |
| BTU/LB. | 18354 |

FURNACE CONFIGURATION: Furnace geometry is determined from furnace drawings 20. Unit 1 is a 585 MW (approximate), double reheat, supercritical pressure boiler. It was put in service in 1968. The original design was fired with No. 6 fuel oil cell burners. Sixteen cell burners are arranged two rows high on the front and rear walls, with four cells in each row. Each cell contains three burner elements, giving a total of forty-eight. Flue gas is recirculated to the furnace hopper for steam temperature control.

In 1995, the firing system was reconfigured to reduce $NO_x$ emissions. The new firing system configuration is determined from OEM burner and OFA drawings. The original cell geometry is maintained in the new firing system. The modifications include:

1. Switching the upper level of burner elements in all top cells to OFA ports, and redistributing the fuel oil to the forty remaining burner elements.
2. Adding two OFA wing ports at a slightly higher elevation than the top cells and outside the cell array on each of the front and rear walls.
3. Increasing FGR system capacity and adding capability to recirculate flue gas to the windbox.

FIG. 1 gives a schematic representation of the Fuel, Air and Flue Gas Flows, including FGR distribution to the furnace hopper and windbox. It also shows the general locations where the various functional responses are measured. Emission measurement equipment is located at the inlet arid outlet of the SCR 60, and thermocouples are located in tubes in the furnace. The SCR is the selective catalytic reactor device typically used for NOx reduction. Therefore, NOx analyzers or continuous emission monitors (CEMs) at the inlet and outlet are used to monitor the removal efficiency of the SCR. The outlet monitor is typically located on the stack in an array of CEM equipment for NOx, SOx, $CO_2$, and opacity. CO and $O_2$ CEMs are located in the ductwork after the furnace exit.

Figure 2:
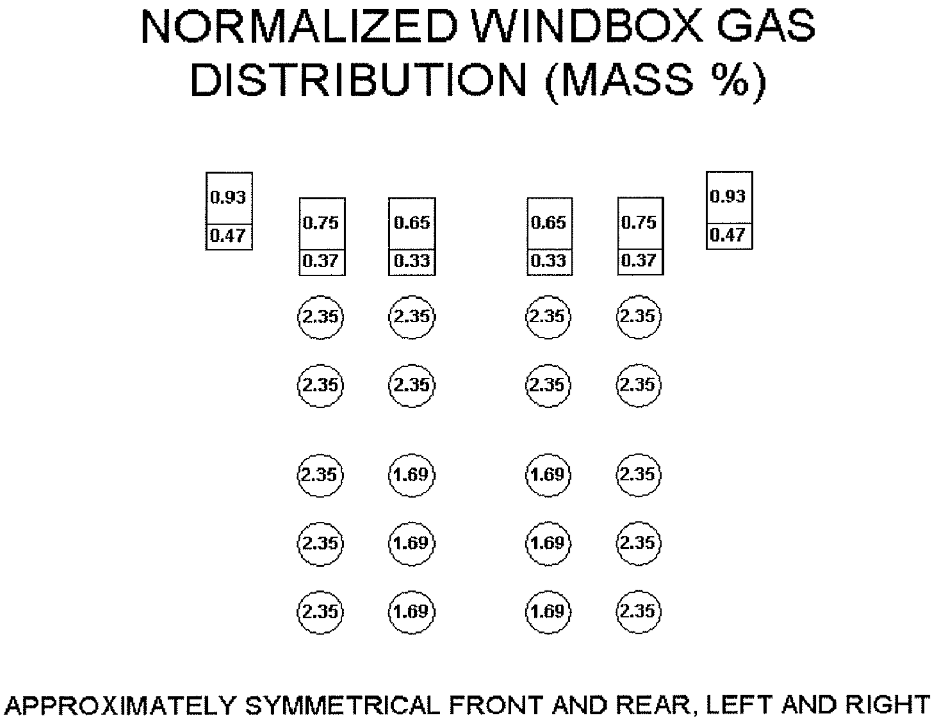
FIG. 2 is an example illustration of the geometry of a burner cell and OFA arrangement on each wall. It is also shows the normalized windbox gas distribution mass percentage.

FIG. 2 displays the Normalized Windbox Gas Distribution Mass % in a format that also illustrates the geometry of the burner cell and OFA arrangement on each wall. All flows are approximately symmetrically distributed both to front and rear walls, and to left and right on each wall. The OFA constitutes 14% of the total Windbox mass flow.

A windbox gas distribution analysis is helpful to account for the fact that there may be two different furnace operating configuration, i.e. with the hopper dam ON and OFF. The Normalized Windbox Gas Distribution is determined using the four-step procedure below:

1. Analyze OFA velocity pressure data from 1995 OEM Acceptance Test employing hydraulic radius method.
2. Correlate windbox-furnace pressure differential data to wind box mass input less OFA flows for integrity check.
3. Distribute residual flow among burners using flow resistance inversely proportional to register opening (supported by register pressure differential).
4. Combine OFA analysis with burner results into combined windbox gas distribution estimate.

The above procedure was required in this particular example to develop distributions for the air and flue gas to the various furnace input ports with only damper position and flow data from previous tests for each of the configurations. The Windbox gas includes combustion air (including OFA) and recirculated flue gas.

Figure 3:
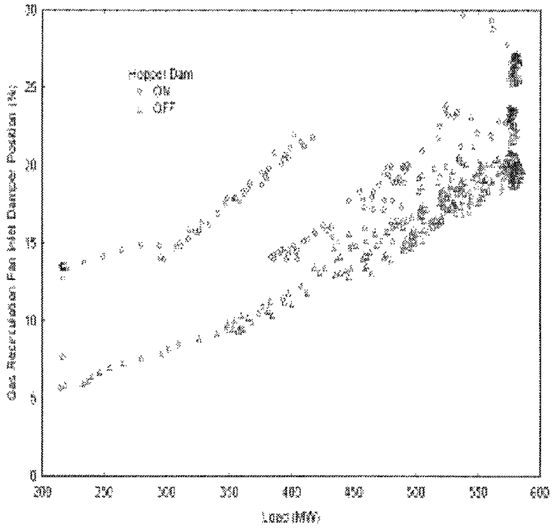
FIGS. 3 and 3*a* show two plots; one for the flue gas recirculation (FGR) inlet damper position versus load, and one for the FGR windbox damper position versus load, respectively.
Figure 3A:
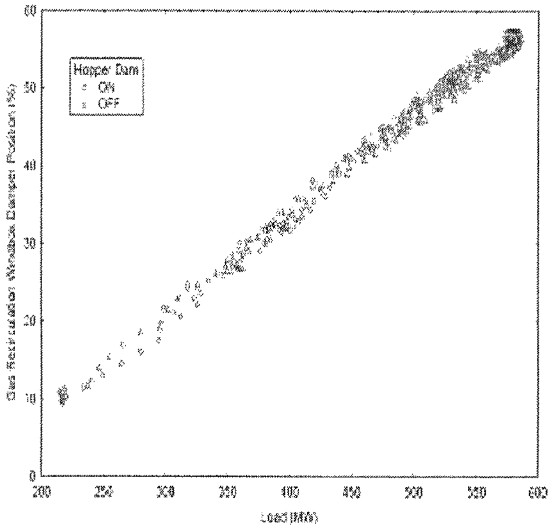

FGR, particularly the hopper dam position, is key to interpreting functional response results 70. FIG. 3 shows two plots, FGR Inlet Damper Position (%) vs. Load (MW), and FGR Windbox Damper Position (%) vs. Load (MW). The FGR inlet damper position is operated differently over the load range according to whether the hopper dam is ON or OFF. The windbox damper position displays a simple linear response to load for the entire data set.

Figure 4:
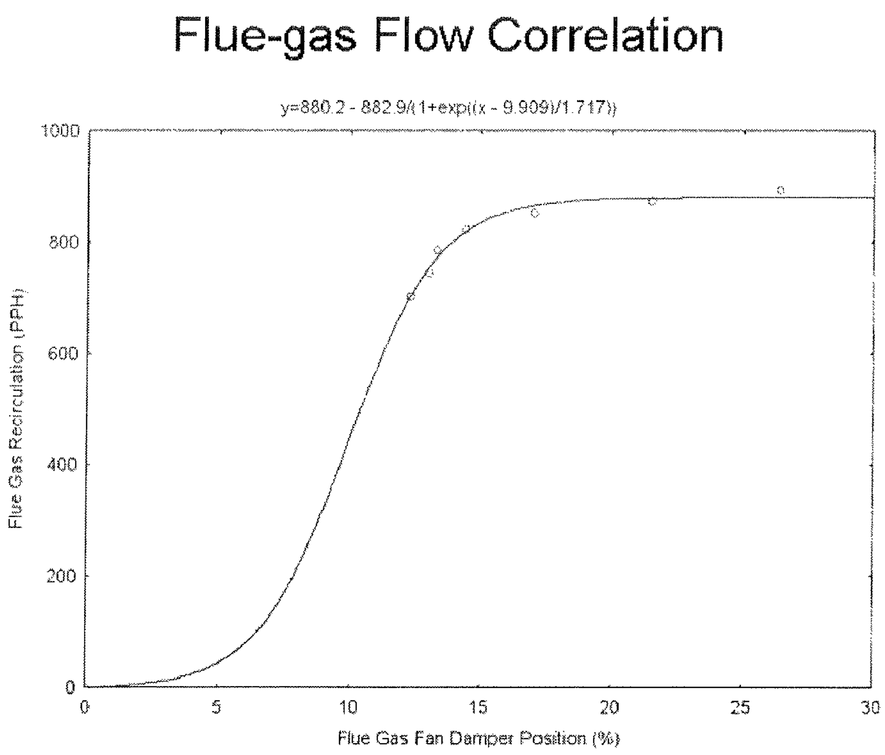
FIG. 4 is a graph of the flue-gas flow correlation to the damper position.
Figure 5:
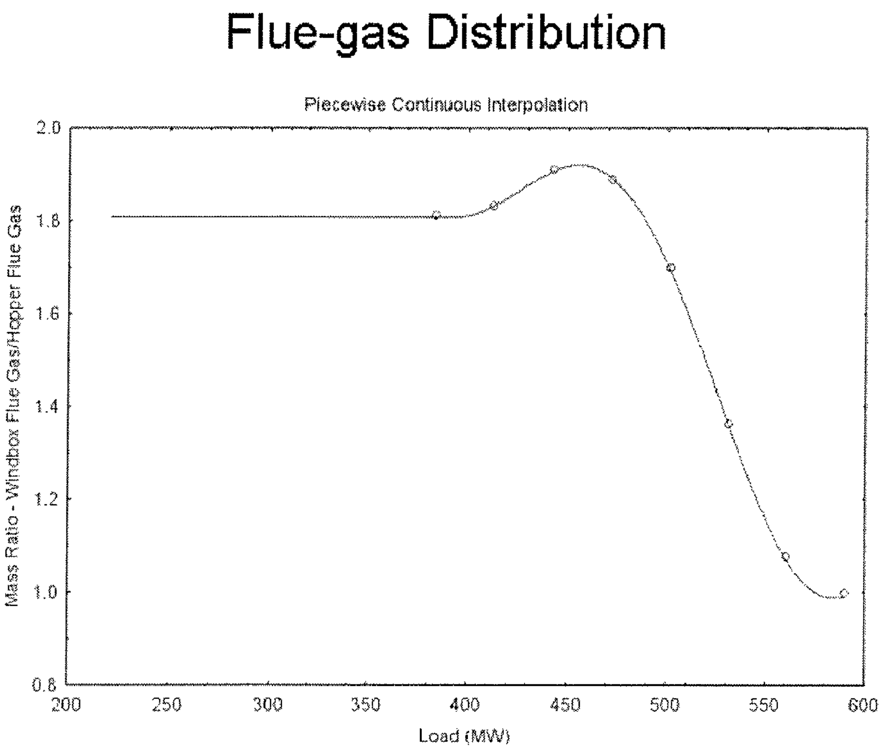
FIG. 5 is a graph of the flue-gas distribution to the furnace hopper and windbox versus load.

FGR mass flow (pph) responds to FGR Fan Damper Position (%) in a sigmoid fashion as displayed in FIG. 4 (Flue-gas Flow Correlation). Consequently, the Mass Ratio—Windbox FGR Flow:Furnace Hopper FGR Flow vs. Load (MW) also exhibits a complex relationship as shown in FIG. 5. At full load, this ratio is roughly 1:1. The hopper dam is typically ON at full-load because FGR to the hopper is not required to increase reheat steam temperatures. Minimal FGR flow to the furnace hopper is used to prevent reverse flow of hot furnace gases. The key point that will become apparent in the functional response analysis is that the furnace exhibits two independent modes of operation, one when the hoper dam is ON, and another when it is OFF.

FUNCTIONAL RESPONSES: In general, the historical or archived Unit 1 operating data are instantaneous data points taken at five-minute intervals. The exception is that the $CO_2$ and $SO_2$ emissions data are 1-hour averages.

Figure 6:
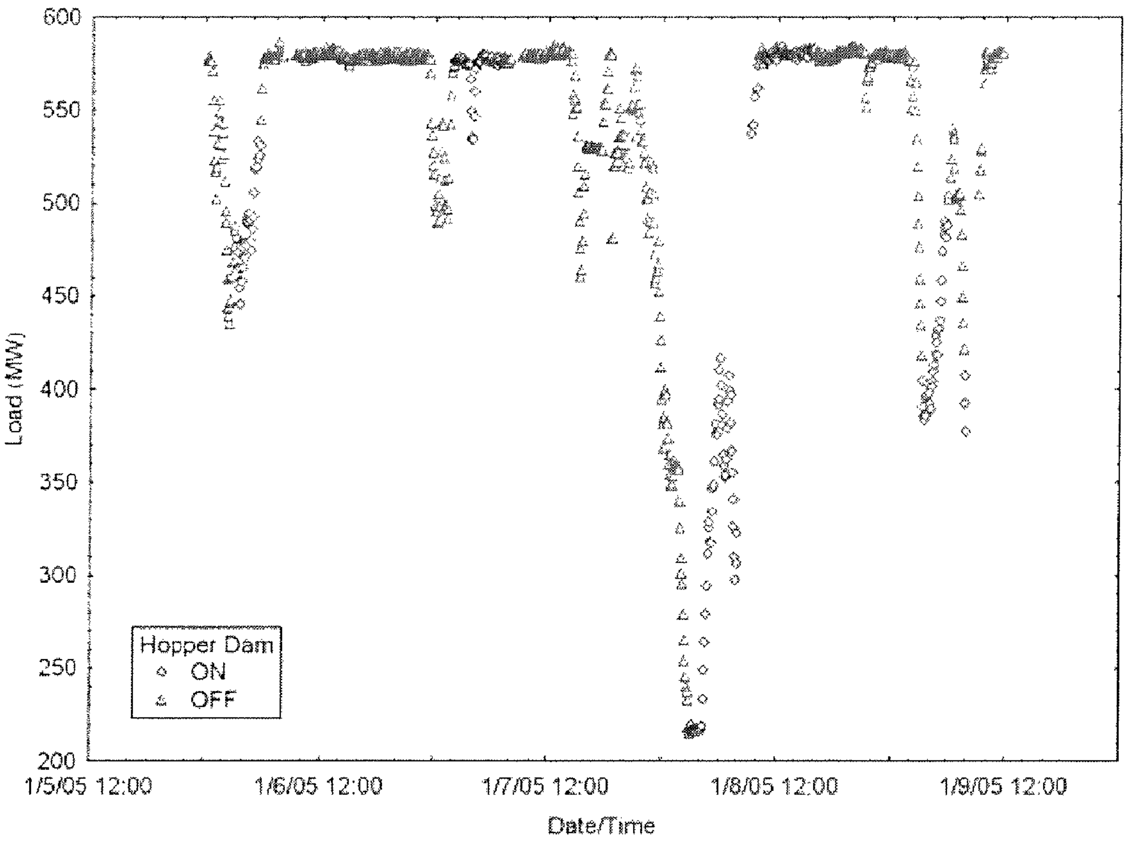
FIG. 6 is a graph of the historical data of the load response over a particular time period.

The historical Unit 1 Load (MW) data for the period between Jan. 6, 2005 00:00 and Jan. 9, 2005 12:00 are displayed in FIG. 6. The data set was abbreviated by omitting data for Jan. 10, 2005 and Jan. 11, 2005 due to Bad Data responses for the $NO_x$ analyzer at the SCR inlet during this period. The load response data is color-coded according to whether the hopper dam is ON (red diamond symbols) or OFF (green triangle symbols). There are periods of operation with the hopper dam both ON and OFF over the entire load range, including full load.

The remainder of the functional response discussion is divided into sections according to the four functional responses of interest:

1. FURNACE $NO_x$ EMISSION (SCR INLET)
2. OPACITY
3. METAL TEMPERATURE
4. $NO_x$ EMISSION AT SCR EXIT AND CORRESPONDING SCR EFFICIENCY

Each topical discussion will address both the current functional response for the low-$NO_x$ firing configuration, and the estimated change in functional response due to fuel redistribution 80. The fuel redistribution being considered is to restore the burner elements to the top level in the upper cell rows, and to redistribute the fuel oil equally among the 48 burner elements, rather than the 40 burner elements in the current firing system configuration.

Figure 7:
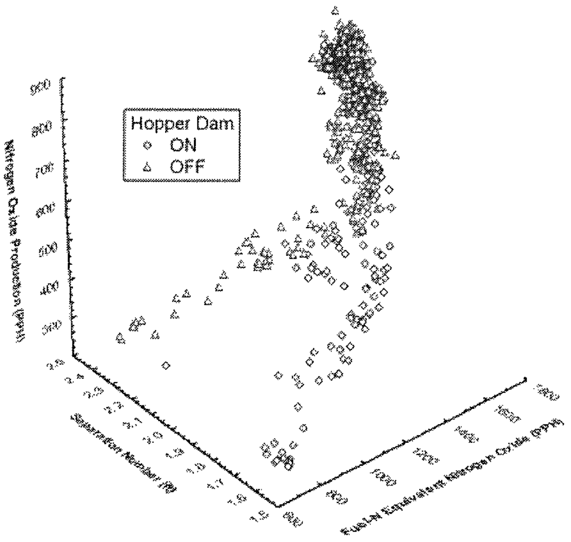
FIG. 7 shows furnace $NO_x$ emissions data as a function of the separation number variable and load factor.

FURNACE $NO_x$ EMISSION (SCR INLET): FIG. 7 displays furnace $NO_x$ emissions data as function of Separation Number and load factor (Fuel-N equivalent Nitrogen Oxide). The data is color-coded according to the scheme used in the previous figure showing historical Load data; red diamonds indicate that the hopper dam is ON, and green triangles indicate that the hopper dam is OFF. The figure illustrates the key difference in furnace behavior for hopper dam ON and OFF.

Figure 8:
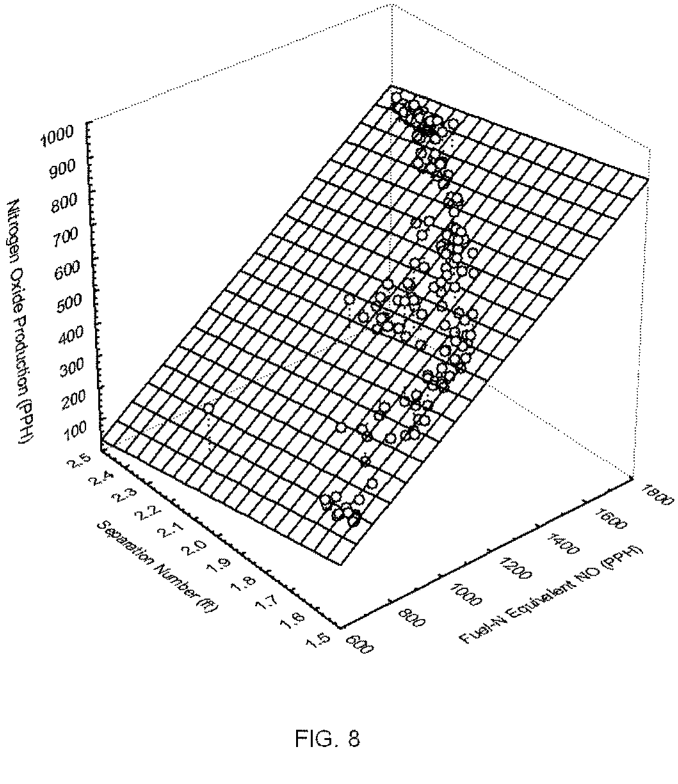
FIGS. 8 and 9 show independent correlations for furnace $NO_x$ emission with separation number and load factor for the hopper dam in the ON and OFF positions, respectively.
Figure 9:
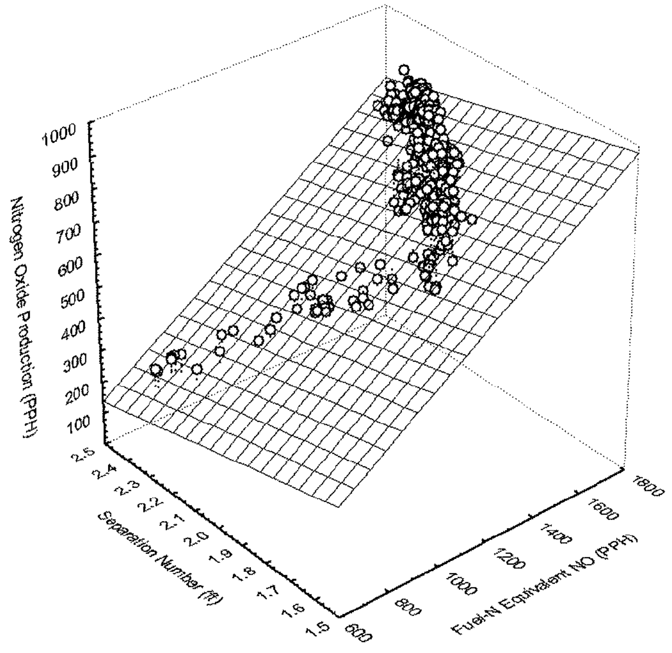

FIGS. 8 and 9 display independent correlations for furnace $NO_x$ emission (pph) with Separation Number and load factor (Fuel-N equivalent Nitrogen Oxide) for the hopper dam ON and OFF, respectively. The intercept shows significantly higher (4×) thermal $NO_x$ component in the total emission when the hopper dam is OFF. The coefficient of the Fuel-N equivalent Nitrogen Oxide (FNO) gives the conversion efficiency for fuel $NO_x$ generation, i.e., 59% and 53% for the two cases of hopper dam ON and OFF.

Figure 10:
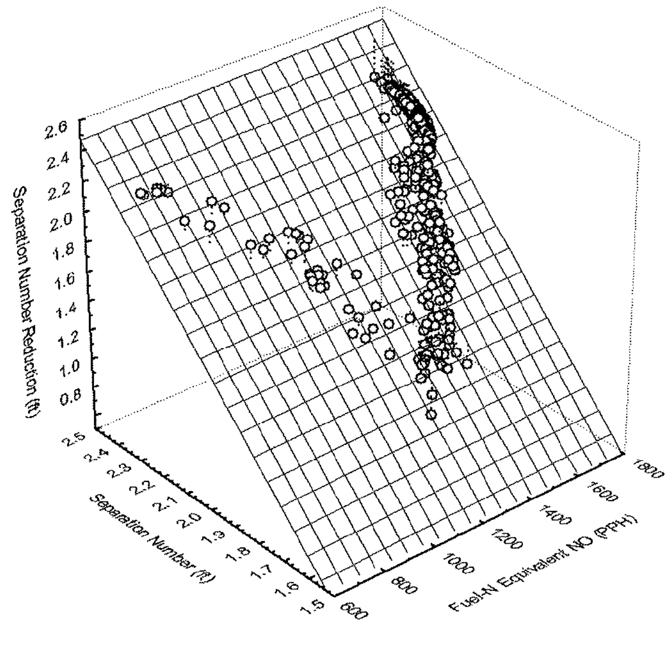
FIG. 10 shows the change in separation number due to fuel redistribution.

FIG. 10 shows the change in Separation Number due to fuel redistribution as defined earlier. The data are for the hopper dam OFF.

Figure 11:
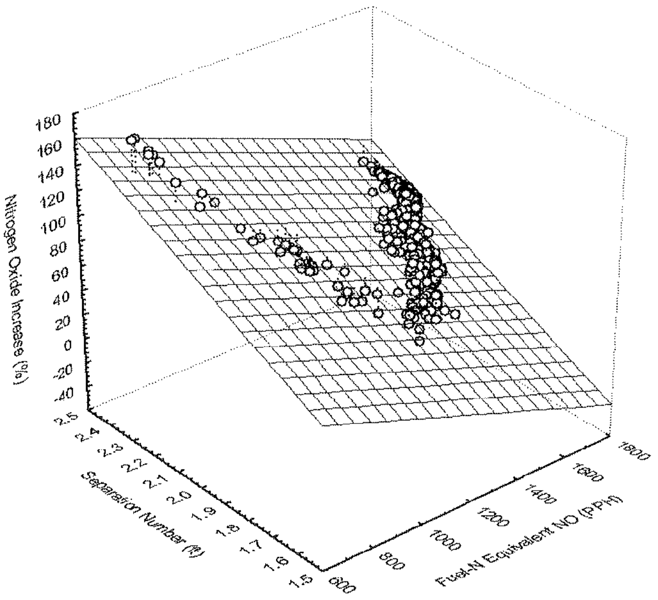
FIG. 11 shows the change in furnace nitrogen oxide emission due to fuel redistribution.

FIG. 11 shows the corresponding change in furnace $NO_x$ emission with change in Separation Number due to fuel redistribution. Fuel redistribution will increase furnace $NO_x$ emissions by 40% to 60%. The Generating Station will continue to experience the $NO_x$ reduction benefit of both the wing OFA ports and FGR to the windbox. The combined effectiveness is roughly equivalent to that of the OFA ports that are eliminated in this case. The Generating Station could investigate biasing the fuel oil and air among the 48 burner-element array for the purpose of increasing Separation Number and reducing furnace $NO_x$ emission.

Figure 12:
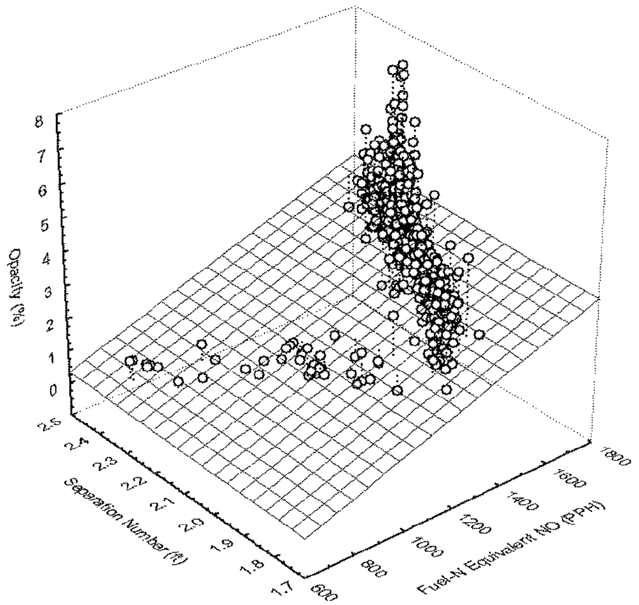
FIG. 12 shows the correlation of opacity with separation number and load factor with the hopper dam in the OFF position.

OPACITY: FIG. 12 shows the correlation of opacity with Separation Number and load factor with the hopper dam OFF. This figure shows a strong response to load, and a high level of variability at high load that is independent of Separation Number. This observed variability is due to burner performance issues.

Figure 13:
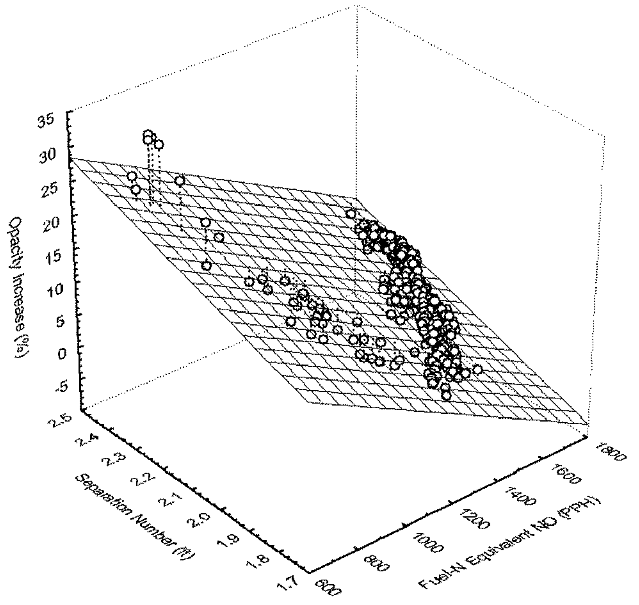
FIG. 13 shows the change in opacity due to fuel redistribution.

FIG. 13 shows change in opacity with change in Separation Number due to fuel redistribution. Fuel redistribution will produce a 5% relative increase in opacity.

Figure 14:
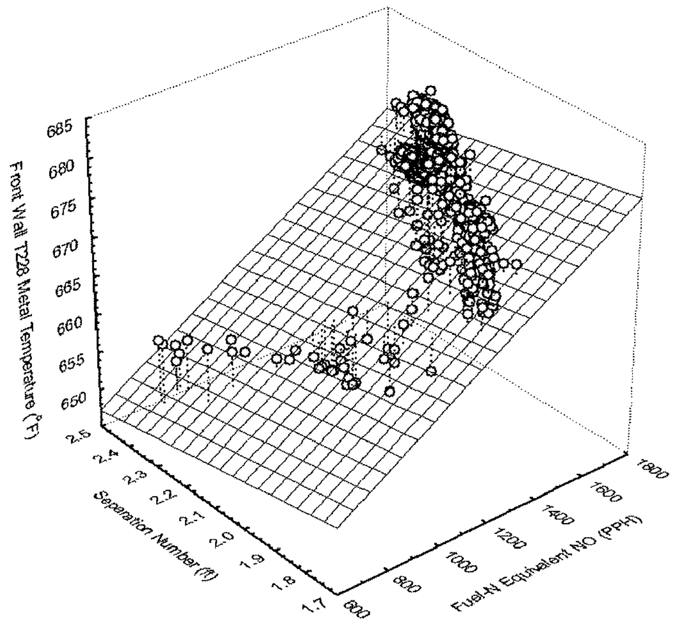
FIG. 14 shows the correlation of metal temperature at a specific location in the furnace with the separation number.
Figure 15:
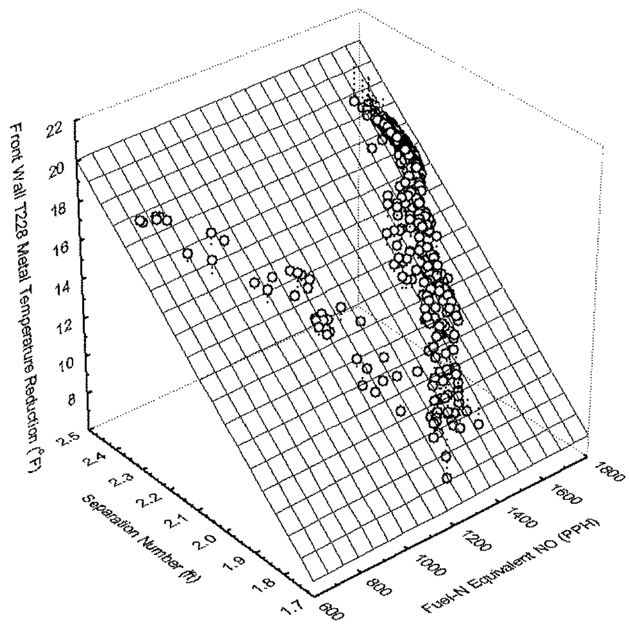
FIG. 15 shows the change in metal temperature at the same specific location due to fuel redistribution.

METAL TEMPERATURE: FIG. 14 shows the correlation of metal temperature at a specific location in the furnace (Front Wall T228) with Separation Number. FIG. 15 shows the change in metal temperature for the same front wall thermocouple with change in Separation Number due to fuel redistribution. For this case/example, fuel redistribution will result in a reduction in metal temperature.

The table below shows the result of applying the same methodology to predict the impact of fuel redistribution on tube failure rate for selected locations in the furnace. The locations are identified in the first column, and represent a variety of furnace conditions. The results display a significant range of responses, from a 62% reduction to a 49% increase in tube failure rates. There was no data on tube failure rates, so the predicted incidence rate change must be applied according to Generating Station experience. The predicted incidence rate changes exhibited in the figure are based on applying ASME Pressure Vessel Codes. It can be conservatively estimated that the failure rate roughly doubles with each 50° F. increase in metal temperature over the temperature range where the particular metal type is susceptible to corrosion or structural failure.

SELECTED RESULTS INDICATING THE IMPACT OF FUEL REDISTRIBUTION ON TUBE FAILURE RATE

| LOCATION | | SEPARATION NUMBER COEFFICIENT | TUBE FAILURE INCIDENCE CHANGE |
|---|---|---|---|
| FURNACE SCREEN | T29 | +13.05 | +49% |
| $3^{RD}$ PASS OUTLET RISER | T260 | +3.695 | +12% |
| FRONT WALL | T165 | +3.625 | +12% |
| FRONT WALL | T228 | −8.126 | −28% |
| REAR WALL | T2 | −2.926 | −9% |
| LEFT SIDE WALL | T223 | −9.130 | −32% |
| RIGHT SIDE WALL | T233 | −15.73 | −62% |

Figure 16:
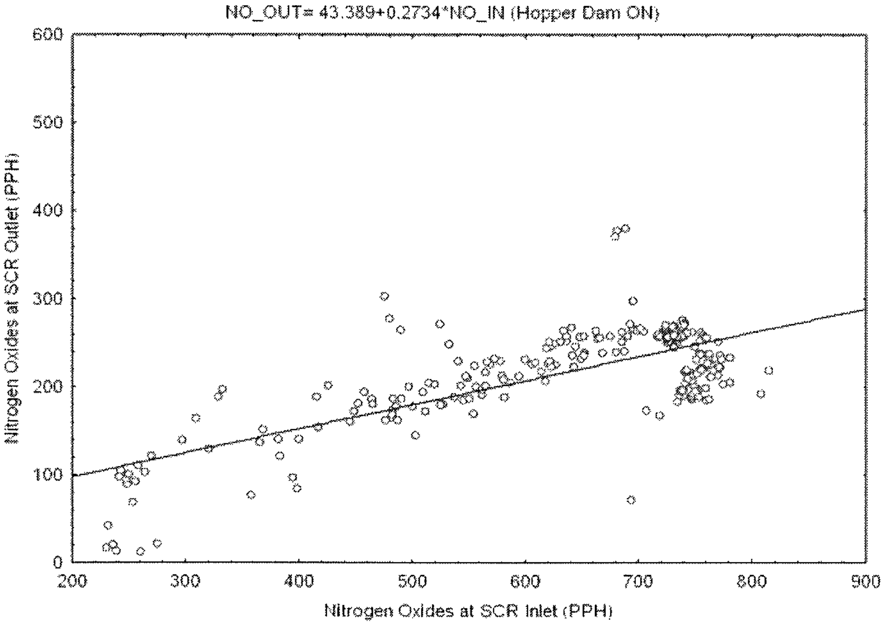
FIGS. 16 and 17 show SCR performance being influenced by furnace operations as impacted by the conditions of the flue gas entering the SCR (function of the hopper dam position).
Figure 17:
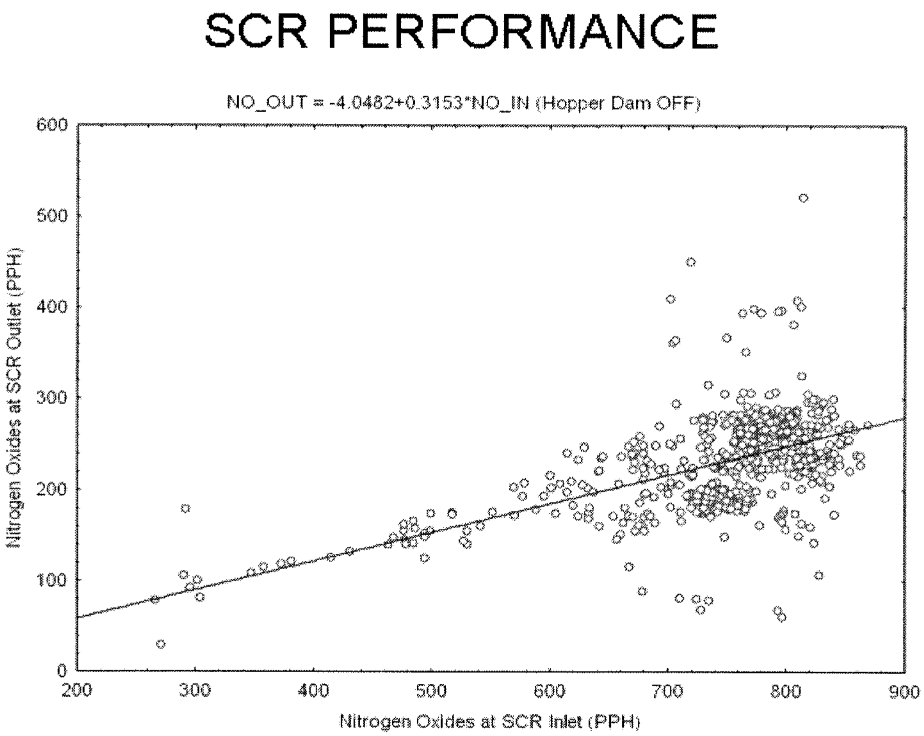

$NO_x$ EMISSION AT SCR EXIT AND SCR EFFICIENCY: FIGS. 16 AND 17 display correlations of $NO_x$ emission levels after the SCR (stack CEMs) with the hopper dam ON and OFF, respectively. Once again, the impact of the furnace hopper dam is evident in the functional response. SCR performance is influenced by furnace operations as it impacts the conditions of the flue gas entering the SCR. In particular, SCR performance is reduced when the hopper dam is ON, indicating potential problems with gas composition and temperature distribution at the SCR inlet due to mixing issues that begin in the furnace.

Figure 18:
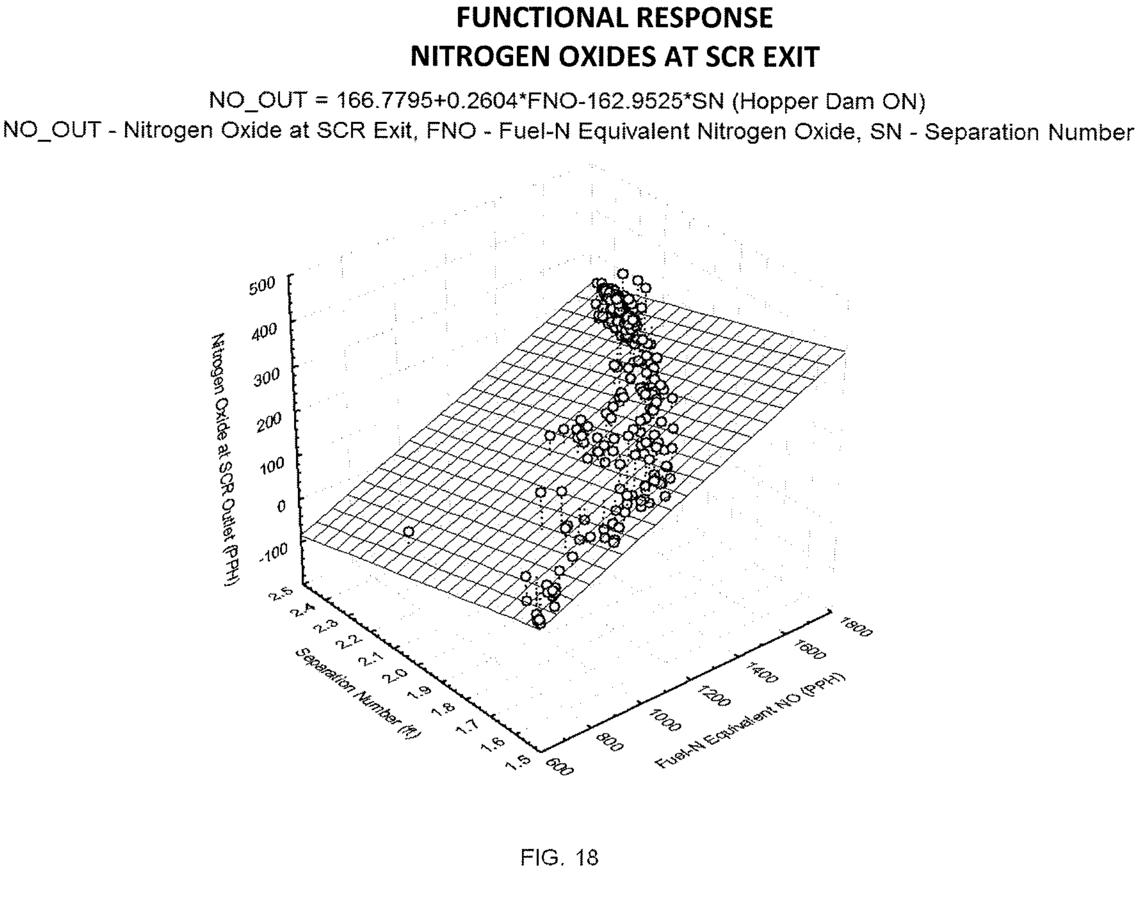
FIGS. 18 and 19 show the correlations of $NO_x$ emission at the SCR exit for the hopper dam in the ON and OFF positions, respectively.
Figure 19:
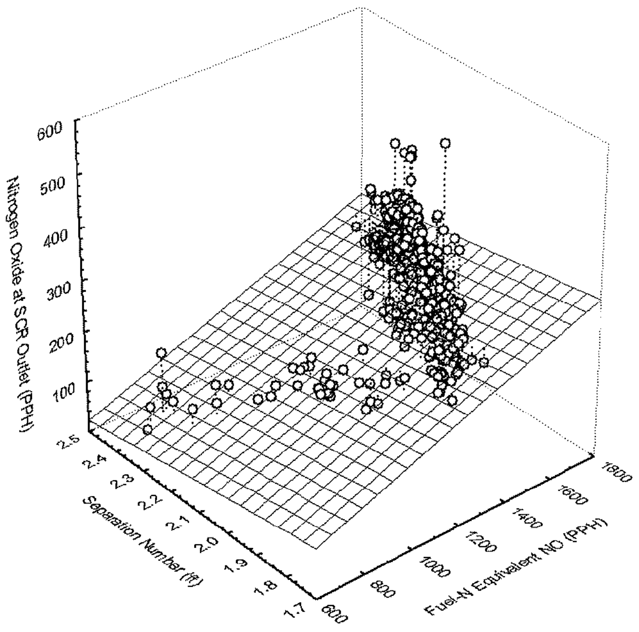

FIGS. 18 and 19 show correlations of $NO_x$ emission at the SCR exit with Separation Number and load factor for the hopper dam ON and OFF, respectively. Intercepts for the two correlations are positive and about the same (167 and 158, respectively for the hopper dam ON and OFF), which indicates that other performance factors influence $NO_x$ emissions at the SCR exit. The significant variability observed in the high-load response data supports this idea. Separation Number coefficients indicate lower impact on $NO_x$ emission at the SCR exit when the hopper dam is OFF (163 vs. 96 respectively for the hopper dam ON and OFF).

Figure 20:
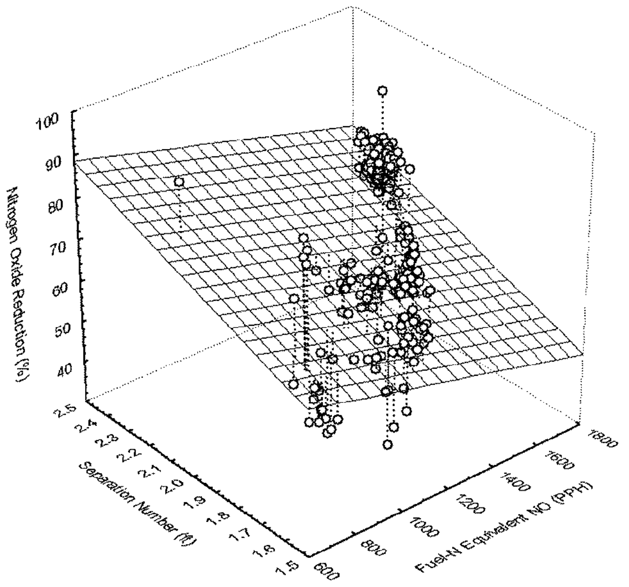
FIGS. 20 and 21 show the SCR efficiency response for the hopper dam in the ON and OFF positions, respectively.
Figure 21:
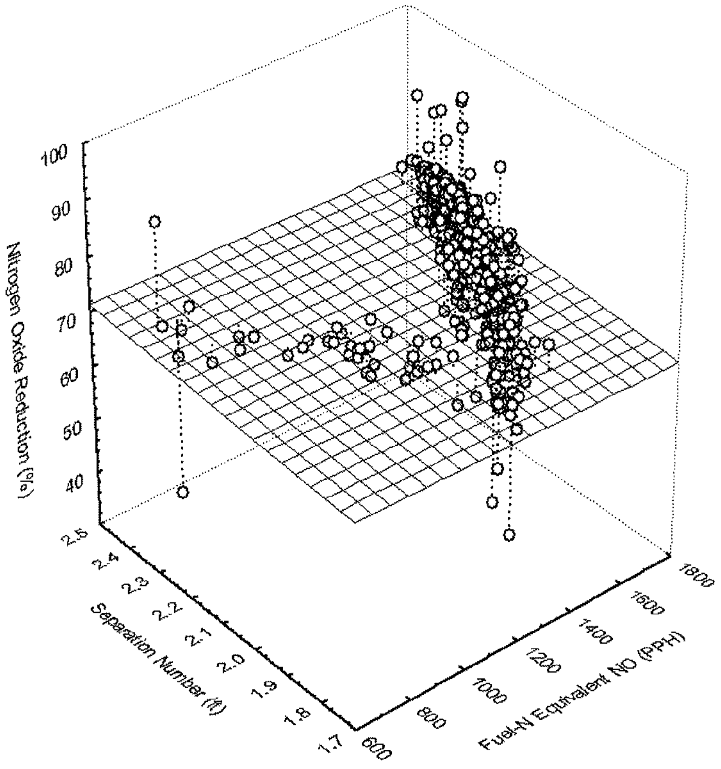

FIGS. 20 and 21 display correlations of SCR efficiency (% $NO_x$ reduction) with Separation Number and load factor for the hopper dam ON and OFF, respectively, SCR efficiency shows a strong response when the hopper dam is ON, which corresponds with the performance discussion above. FIG. 20 shows reduced SCR efficiency for lower Separation Number and higher load. Increased flue gas recirculation flow to the hopper is strongly influencing mixing behaviors in the burner zone, which leads to poor SCR performance as well as efficiency. The SCR efficiency response to Separation Number and load factor is flat when the hopper dam is OFF.

CONCLUSION: Fuel redistribution to 48 burner elements, rather than the 40 burner elements in the current low-$NO_x$ firing system (i.e., restore firing to upper level of burner elements in top row of cells, which corresponds to the OFA ports in the current low-$NO_x$ firing system) will result in:

40 to 60% increase in furnace $NO_x$ emissions, and therefore increase in inlet to SCR 5% relative increase in opacity Location-dependent change in metal temperatures, which will give a corresponding change in failure rate when applied to previous experience The Separation Number is an independent variable, which exhibits strong correlation with a number of functional responses, and therefore is useful in analyzing equipment performance and proposed changes.

The invention claimed is:

1. A method for estimating the impact of fuel distribution or furnace configuration on a fossil fuel-fired furnace, comprising the steps of:

inputting fuel oil and air into said furnace;

determining a separation number, S, wherein in a planar plot taking into account a load variable, S provides a linear relationship to multiple furnace process responses, said load variable indicative of an amount of $NO_x$ that is formed if all of said fuel oil and air were converted to said $NO_x$;

locating emission measurement equipment at an inlet and outlet of selective catalytic reactor of said furnace and locating thermocouples in tubes of said furnace, wherein said multiple furnace process responses can be measured to obtain operating data;

interpreting said operating data based on different modes of operation of said furnace; and, estimating a change in said multiple furnace process responses as a function of said separation number, wherein said change is quantified to determine an impact of said fuel distribution or said furnace configuration as a result of said operating data lying on said planar plot defined by said separation number and said load variable.

2. The method of claim 1, further comprising the step of obtaining fuel analyses for said fuel oil and converting said multiple furnace process responses from a volumetric emission or mass emission per unit of energy to mass emission rate such that said separation number can be determined.

3. The method of claim 2, wherein said separation number is determined by the equation:

$$S = \sqrt{\sum_i \left( \frac{\sum_k (\dot{m}_{ok} x_{ik})}{\sum_k (\dot{m}_{ok})} - \frac{\sum_k (\dot{m}_{jk} x_{ik})}{\sum_k (\dot{m}_{jk})} \right)^2}$$

where $\dot{m}_{fk}$ and $\dot{m}_{ok}$ are a mass rate of said fuel oil and said air respectively through a port k of said furnace, and $X_{ik}$ corresponds to x, y and z values of said port k.

4. The method of claim 1, wherein before the step of locating said emission measurement equipment, an initial data request is made to generating station personnel for current operational data and drawings.

5. The method of claim 4, wherein a geometry of said furnace is determined from said drawings to assist in the step of locating said emission measurement equipment.

6. The method of claim 1, wherein said multiple furnace process responses are selected from the group consisting of windbox gas including combustion air and flue gas, $NO_x$ emission at said inlet of said selective catalytic reactor, $NO_x$ emission at said outlet of said selective catalytic reactor, furnace opacity, and furnace metal temperature.

7. The method of claim 6, wherein said multiple furnace process responses are measured when a hopper dam is in an on or off position depending on said mode of operation of said furnace.

8. The method of claim 6, wherein a distribution of said windbox gas is determined from a method comprising the steps of:

analyzing over fire air velocity pressure data;

correlating windbox-furnace pressure differential data to windbox mass input less over fire air flows;

distributing residual flow among burners; and combining over fire air analysis with burner results into a combined windbox gas distribution estimate.

9. A method for estimating the impact of fuel distribution or furnace configuration on a fossil fuel-fired furnace, comprising the steps of:

inputting fuel oil and air into said furnace;

determining a variable, S, wherein in a planar plot taking into account a load variable, S provides a linear relationship to multiple furnace process responses, said load variable indicative of an amount of $NO_x$ that is formed if all said fuel oil and said air were converted to said $NO_x$;

locating emission measurement equipment at said furnace to obtain operating data;

interpreting said operating data based on different modes of operation of said furnace; and, estimating a change in said multiple furnace process responses as a function of said variable S, wherein said change is quantified to determine an impact of said fuel distribution or said furnace configuration as a result of said operating data lying on said planar plot defined by said variable S and said load variable.

10. The method of claim 9, further comprising the step of obtaining fuel analyses for said fuel oil and converting said multiple furnace process responses from a volumetric emission or mass emission per unit of energy to mass emission rate such that said variable can be determined.

11. The method of claim 10, wherein said variable S is determined by the equation:

$$S = \sqrt{\sum_i \left( \frac{\sum_k (\dot{m}_{ok} x_{ik})}{\sum_k (\dot{m}_{ok})} - \frac{\sum_k (\dot{m}_{jk} x_{ik})}{\sum_k (\dot{m}_{jk})} \right)^2}$$

where $\dot{m}_{fk}$ and $\dot{m}_{ok}$ are a mass rate of said fuel oil and said air respectively through a port k of said furnace, and $x_{ik}$ corresponds to x, y and z values of said port k.

12. The method of claim 9, wherein before the step of locating said emission measurement equipment, an initial data request is made to generating station personnel for current operational data and drawings.

13. The method of claim 12, wherein a geometry of said furnace is determined from said drawings to assist in the step of locating said emission measurement equipment.

14. The method of claim 9, wherein said multiple furnace process responses are selected from the group consisting of windbox gas including combustion air and flue gas, $NO_x$ emission at an inlet of said selective catalytic reactor, $NO_x$ emission at an outlet of said selective catalytic reactor, furnace opacity, and furnace metal temperature.

15. The method of claim 14, wherein said multiple furnace process responses are measured when a hopper dam is in an on or off position depending on said mode of operation of said furnace.

16. The method of claim 14, wherein a distribution of said windbox gas is determined from a method comprising the steps of:

analyzing over fire air velocity pressure data;

correlating windbox-furnace pressure differential data to windbox mass input less over fire air flows;

distributing residual flow among burners; and combining over fire air analysis with burner results into a combined windbox gas distribution estimate.

* * * * *